(12) United States Patent
Qin et al.

(10) Patent No.: US 9,916,386 B2
(45) Date of Patent: Mar. 13, 2018

(54) METHOD AND APPARATUS FOR PRESENTING SEARCH RESULT

(71) Applicant: Baidu (China) Co., Ltd., Shanghai (CN)

(72) Inventors: Shouke Qin, Shanghai (CN); You Han, Shanghai (CN); Nan Wang, Shanghai (CN); Fei Huang, Shanghai (CN); Xiaohua Cheng, Shanghai (CN); Peizhi Xu, Shanghai (CN); Binxin Liu, Shanghai (CN); Xiaosong Li, Shanghai (CN); Qing Xu, Shanghai (CN); Chunli Chen, Shanghai (CN)

(73) Assignee: BAIDU (CHINA) CO., LTD., Shanghai (CN)

( * ) Notice: Subject to any disclaimer, the term of this patent is extended or adjusted under 35 U.S.C. 154(b) by 363 days.

(21) Appl. No.: 14/586,652

(22) Filed: Dec. 30, 2014

(65) Prior Publication Data

US 2015/0278376 A1   Oct. 1, 2015

(30) Foreign Application Priority Data

Apr. 1, 2014 (CN) .......................... 2014 1 0128991

(51) Int. Cl.
*G06F 7/00* (2006.01)
*G06F 17/30* (2006.01)

(52) U.S. Cl.
CPC .. *G06F 17/30867* (2013.01); *G06F 17/30864* (2013.01)

(58) Field of Classification Search
CPC ...................... G06F 17/30867; G06F 17/30864
(Continued)

(56) References Cited

U.S. PATENT DOCUMENTS

| 7,716,161 B2 * | 5/2010 | Dean ..................... G06Q 30/02 705/14.49 |
| 2005/0060290 A1 * | 3/2005 | Herscovici ........ G06F 17/30864 |

(Continued)

OTHER PUBLICATIONS

Shen, et al.: "Exploiting Personal Search History to Improve Search Accuracy," Personal Information Management—A SIGIR 2006 Workshop, pp. 94-97, Retrieved from the Internet: URL: http://pim.ischool.washington.edu/pim06/files/shen-paper.pdf.

(Continued)

*Primary Examiner* — Kris Mackes
*Assistant Examiner* — Lin Lin Htay
(74) *Attorney, Agent, or Firm* — Orrick, Herrington & Sutcliffe LLP

(57) ABSTRACT

A method and apparatus for presenting a search result. The method comprises: receiving a current search term input by a user; determining user information about a user, and determining a pre-established first model corresponding to the user according to user information, the first model recording historical data of the user, and the historical data comprising a historical search term and a corresponding historical selection result; determining, in the historical data, a historical search term matched with the current search term, determining a historical selection result corresponding to the matched historical search term, and determining an online recommendation result according to the historical selection result; and presenting a search result to the user, the search result comprising the online recommendation result or a result obtained by processing the online recommendation result. The disclosed method can provide a personalized search service, so that the search result better meets the user's needs.

20 Claims, 7 Drawing Sheets

(58) Field of Classification Search
USPC .......................................................... 707/706
See application file for complete search history.

(56) References Cited

U.S. PATENT DOCUMENTS

| | | | |
|---|---|---|---|
| 2006/0074883 A1 | 4/2006 | Teevan et al. | |
| 2007/0038614 A1* | 2/2007 | Guha | G06Q 30/02 |
| 2008/0172422 A1 | 7/2008 | Li et al. | |
| 2008/0270384 A1* | 10/2008 | Tak | G06F 17/30734 |
| 2009/0282023 A1* | 11/2009 | Bennett | G06F 17/30646 |
| 2010/0153428 A1* | 6/2010 | Schechter | G06F 17/30867 |
| | | | 707/768 |
| 2012/0047020 A1* | 2/2012 | Bagherjeiran | G06Q 30/02 |
| | | | 705/14.66 |
| 2013/0013408 A1* | 1/2013 | Hjelm | G06F 17/30867 |
| | | | 705/14.54 |
| 2013/0073546 A1* | 3/2013 | Yan | G06F 17/30321 |
| | | | 707/732 |
| 2014/0026156 A1* | 1/2014 | Deephanphongs | |
| | | | H04N 21/25866 |
| | | | 725/12 |

OTHER PUBLICATIONS

European Examination Report, Application No. 14200727.7.
Communication pursuant to Article 94(3) EPC, European Patent Application No. 14 200 727.7.

* cited by examiner

Baidu News Webpage Post bar Knows Music Picture Video Map Library More >>

International hypnotist training                                          Baidu

Hypnotist training, Beijing, 12-year experience, sign an agreement to guarantee + certificate of international hypnotist                    www.sunlan.org.cn   $V_2$    Referral links Beijing Shangde hypnotist training, 12-year Hypnotist training experience, 62 5A famous teachers, sign an agreement to guarantee to obtain the Certificate of International Hypnotist Magic hypnosis    Thought reading    Hypnotherapy    Certificate of International Hypnotist    Master hypnosis within 4 days International Institute of Erickson Hypnosis – International hypnotist training    www.qianmeng.cn    $V_1$ Huang-Erickson hypnosis, top-class advanced effective class with three certificates for hypnotist training in China, shocking hypnotherapy of Tutor Huang Xiongbin Enroll the Shenzheng class starting in May by Master of International Hypnotist Training, Liao Yuepeng    www.success111.com International hypnotist training with harmony of body and mind by Master of International Hypnotist Training, Liao Yuepeng in person

Fig. 2(a)

B Shanghai hotel reservation – Booking.com low price! Confirm immediately!

Shanghai hotel reservation, go to [Hotels of popular scenic spot]  Nanjing Road, Town god's Temple, Sheshan   [Popular hotels]
Booking.com!   Happy Valley...
Renmin Square, Shanghai Bund, Xujiahui... [Hotel room classification] Five-star exquisite, Comfortable, Economical, Up to 80% off!
www.booking.com 2014-01    V    Promotion

Beijing fresh flowers, Beijing fresh flowers express, Beijing fresh flowers reservation [51 flower buying website]

[51 flower buying website] is a time-honored physical store for fresh flowers which provides Beijing fresh flower reservation and Beijing fresh flower delivery as an integration...

| Beijing fresh | Fresh flower | Instruction for fresh flower | Love fresh | Fresh flower |
| flowers | stores | delivery services | flowers | categories | www.riswing.com 2014-03   ※ $V_1$   Promotion

Picture — 9

Beijing fresh flowers, Beijing fresh flowers express, Beijing fresh flowers reservation [51 flower buying website]

[51 floWer buYing weBsite] is a time-honored physical store for fresh flowers which provides Beijing fresh flower reservation. Beijing fresh flower express and Beijing fresh flower delivery as an integration...

| Beijing fresh | Fresh flower | Instruction for fresh | Love fresh | Fresh flower |
| flowers | stores | flower delivery services | flowers | categories | www.riswing.com 2014-03   ※ $V_1$   Promotion

METHOD AND APPARATUS FOR PRESENTING SEARCH RESULT

CROSS-REFERENCE TO RELATED APPLICATIONS

The present applications claims priority to Chinese Patent Application No. CN201410128991.1, filed on Apr. 1, 2014, the entire disclosure of which is incorporated herein by reference in its entirety and for all purposes.

TECHNICAL FIELD

The present invention relates to the technical field of searching, and in particular, to a method and apparatus for presenting a search result.

BACKGROUND

At present, a search result provided by a search engine for a user often includes promoted advertisement content, and these advertisements are usually the result of autonomous editing by advertisers.

The following problems exist in the related art: there is often little difference among advertisements which can be provided by a plurality of mutually associated search terms, that is, a plurality of mutually associated search terms may unchangeably correspond to advertisement content released by a certain advertiser; however, the advertisement content is usually the same and shows no difference when being presented to users, and can hardly meet the personalized needs of the users; furthermore, since the personalized needs of the users cannot be properly met, the effectiveness of advertising is also affected.

SUMMARY

The present invention is intended to solve one of the technical problems in the related art at least to some extent.

For this purpose, a first objective of the present invention is to propose a method for presenting a search result. The method can provide a personalized search service for a user, so that the search result better meets the user's needs.

A second objective of the present invention is to propose an apparatus for presenting a search result.

In order to achieve the above-mentioned objectives, a method for presenting a search result of a first aspect embodiment of the present invention comprises: receiving a current search term input by a user; determining user information about the user, and determining a pre-established first model corresponding to the user according to the user information, the first model recording historical data of the user, and the historical data comprising a historical search term and a corresponding historical selection result; determining, in the historical data, a historical search term matched with the current search term, determining a historical selection result corresponding to the matched historical search term, and determining an online recommendation result according to the historical selection result; and presenting a search result to the user, the search result comprising the online recommendation result or a result obtained by processing the online recommendation result.

The method for presenting a search result in the embodiments of the present invention can acquire an online recommendation result associated with a user according to a current search term input by the user and user information, and the online recommendation results obtained under different search terms by different users are completely different; therefore, on the one hand, a personalized search service may be provided for the user, so that the search result better meets the user's needs. On the other hand, due to the fact that an online recommendation result better meeting the user's needs is recommended to the user, the online recommendation can be clicked and browsed by the user to the greatest degree possible, thereby improving the click-through rate of the online recommendation result and improving the recommendation effect.

In order to achieve the above-mentioned objectives, an apparatus for presenting a search result of a second aspect embodiment of the present invention comprises: a receiving module, for receiving a current search term input by a user; a first determination module, for determining user information about the user, and determining a pre-established first model corresponding to the user according to the user information, the first model recording historical data of the user, and the historical data comprising a historical search term and a corresponding historical selection result; a second determination module, for determining, in the historical data, a historical search term matched with the current search term, determining a historical selection result corresponding to the matched historical search term, and determining an online recommendation result according to the historical selection result; and a presenting module, for presenting a search result to the user, the search result comprising the online recommendation result or a result obtained by processing the online recommendation result.

The apparatus for presenting a search result of the embodiments of the present invention can acquire an online recommendation result associated with a user according to a current search term input by the user and user information, and the online recommendation results obtained under different search terms by different users are completely different; therefore, on the one hand, a personalized search service may be provided for the user, so that the search result better meets the user's needs. On the other hand, due to the fact that an online recommendation result better meeting the user's needs is recommended to the user, the online recommendation can be clicked and browsed by the user to the greatest degree possible, thereby improving the click-through rate of the online recommendation result and improving the recommendation effect.

The additional aspects and advantages of the present invention will be provided in part in the description below, and will be apparent in part from the description below, or be understood by implementing the present invention.

BRIEF DESCRIPTION OF THE ACCOMPANYING DRAWINGS

The above-mentioned and/or additional aspects and advantages of the present invention will become apparent and easily understood from the description of the embodiments below in conjunction with the accompanying drawings, in which:

FIG. 1 is a flowchart of a method for presenting a search result according to one embodiment of the present invention;

FIGS. 2(a), (b), (c) and (d) are effect presenting charts of a method for presenting a search result according to an embodiment of the present invention;

DETAILED DESCRIPTION OF PREFERRED EMBODIMENTS

Figure 1:
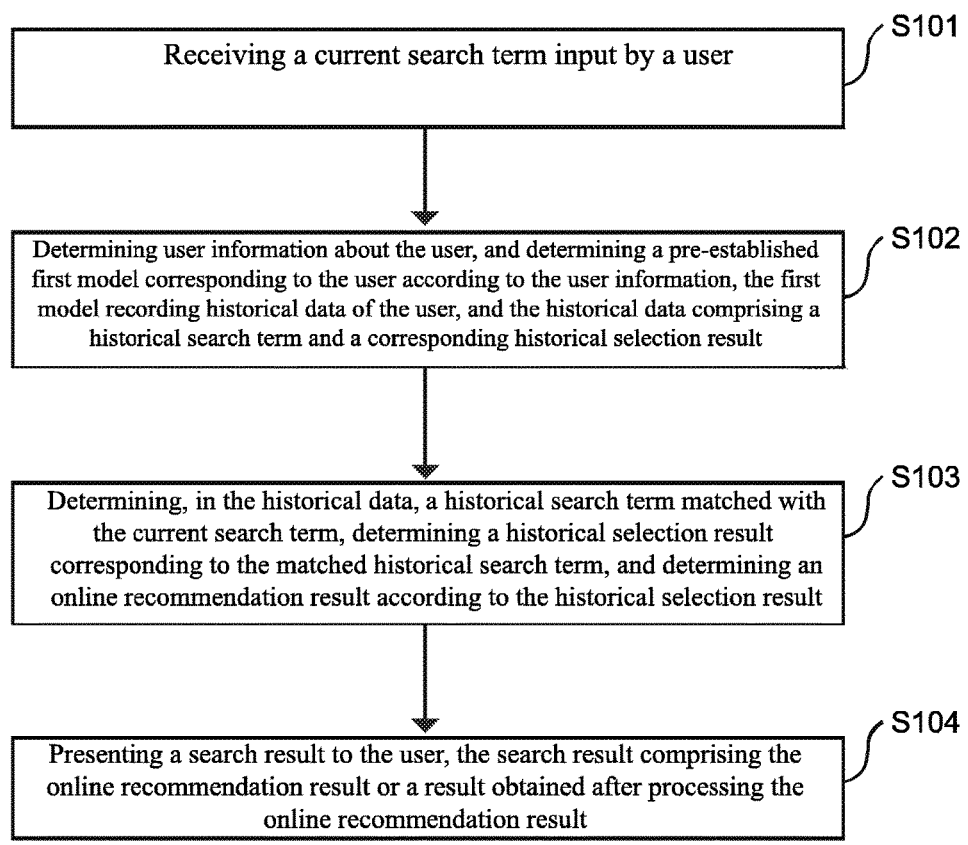

The embodiments of the present invention will be described in detail below, and examples of the embodiments are shown in the accompanying drawings, in which the same or similar reference numerals represent the same or similar elements or elements having the same or similar functions throughout. The embodiments described below by referring to the accompanying drawings are exemplary and are merely used to explain the present invention, rather than being understood as limitations to the present invention. On the contrary, the embodiments of the present invention include all the changes, modifications and equivalents falling into the scope of the spirit and connotations of the appended claims.

In the description of the present invention, it should be understood that the terms "first" and "second", etc. are merely for description purposes, rather than being understood to indicate or imply relative importance. In the description of the present invention, it should be noted that unless explicitly stipulated and defined otherwise, the terms "connected", "connection", etc. should be understood broadly, for example, it may be a fixed connection, or a detachable connection, or an integral connection; it may be a mechanical connection, or an electrical connection; and it may be a direct connection, or an indirect connection by means of an intermediate medium. For those of ordinary skill in the art, the specific meaning of the terms above in the present invention may be understood according to specific situations. Furthermore, in the description of the present invention, unless otherwise specified, the meaning of "more" is two or more than two.

Any process or method description in the flowchart or otherwise described herein may be understood to represent a module, segment or section comprising one or more codes of executable instructions used for implementing a particular logical function or process step, and the scope of the preferred embodiments of the present invention comprises further implementations, wherein functions may be carried out not according to the order shown or discussed, including in a basically synchronous manner or an inverse order in accordance with the functions involved, and this should be understood by those skilled in the art to which the embodiments of the present invention belong.

If a search engine can dynamically present a search result according to a user, a search term and online recommendation information when presenting the search result to the user, a search result meeting personalized needs may be provided for the user. Therefore, the embodiments of the present invention disclose a method and apparatus for presenting a search result, which can provide a search result meeting personalized needs for a user.

The method and apparatus for presenting the search result in the embodiments of the present invention are described below with reference to the accompanying drawings.

FIG. 1 is a flowchart of a method for presenting a search result according to one embodiment of the present invention.

As shown in FIG. 1, the method for presenting a search result comprises:

S101, a current search term input by a user is received.

Specifically, in the embodiments of the present invention, a user can input the current search term in an input box provided by a search engine, and the user can also input search terms in various quick search input boxes, and this is not limited in the embodiments of the method.

S102, user information about the user is determined, and a pre-established first model corresponding to the user is determined according to the user information, the first model recording historical data of the user, and the historical data comprising a historical search term and a corresponding historical selection result.

Specifically, the user information may be obtained according to cookie information, and may also be obtained by means of a registration account number of the user, for example, the search engine obtains identity identification information allocated to a client used by the user in the cookie information, or address information (such as an IP address and a geographic position) of the client used by the user, etc., or the registration account number of the user, etc. The user can be determined by the user information.

The first model is obtained according to a vast amount of historical search behavior data, the historical search behavior data comprising historical selection results of the user on historical search results, and these historical selection results per se reflecting a certain need of the user, for example, different users click and browse different webpages under different historical search terms so as to have different historical search results, and the historical search behavior data may be recorded using a website monitoring statistical tool. The first model may also be obtained according to advertisement-related data spliced in reverse from the historical selection results of the user on the historical search results, for example, the historical search behavior data comprise the historical selection results of the user on the historical search results, and in addition, page content of an advertisement webpage is extracted; if a historical selection result matches with the page content, the historical selection result is replaced by the page content, and anchor text clicked by the user after entering the advertisement webpage by clicking under a certain historical search term may be obtained, for example, the first model comprises a search term, a text link corresponding to the search term and page content (the text link and the page content form the anchor text), and the text link and the page content corresponding to the search term may also serve as the historical selection result.

In one embodiment of the present invention, in S102, the step of determining a pre-established first model corresponding to the user according to the user information specifically comprises determining attribute information corresponding to the user according to the user information; and determining the first model corresponding to the user according to the attribute information corresponding to the user. Specifically, the attribute information about the user, for example, may be the user age, user gender, user region, etc., and the attribute information about the user may be obtained according to a vast amount of historical search behavior data. The first model may be different depending on the attribute information about the user, for example, a user from the 80s and a user from the 70s respectively correspond to different first models, and a woman from the 80s and a man from the 80s also respectively have different first models. Therefore, the search result may be made more targeted.

S103, a historical search term matched with the current search term is determined in the historical data; a historical selection result corresponding to the matched historical search term is determined; and an online recommendation result is determined according to the historical selection result.

Specifically, an online recommendation is recommendation information about a third party, such as an advertisement released by an advertiser, an application program published by a third party platform, etc. In one embodiment of the present invention, the online recommendation also needs to be processed, for example, firstly, a page corresponding to the online recommendation is captured, then a clickable link in the page is parsed out, and then corresponding anchor text is generated according to the clickable link, and a page content segment may also be captured.

In one embodiment of the present invention, the page content segment comprises one or more of text, a picture, audio, video, etc.

In one embodiment of the present invention, the step of determining an online recommendation result according to the historical selection result in S103 specifically comprises: searching in a pre-established online recommendation result repository according to the historical selection result, so as to acquire an online recommendation result corresponding to the historical selection result. More specifically, the pre-established online recommendation result repository may be obtained according to an online recommendation processing result, may also be obtained according to an advertisement released by an advertiser itself and page content corresponding to the advertisement, or obtained according to the page content of an advertisement page of the advertiser extracted by a search engine.

S104, the search result is presented to the user, the search result comprising the online recommendation result or a result obtained by processing the online recommendation result.

Specifically, in the embodiments of the present invention, a search engine may directly present the determined online recommendation result to the user, and may also present the online recommendation result to the user after processing same.

Figure 2B:
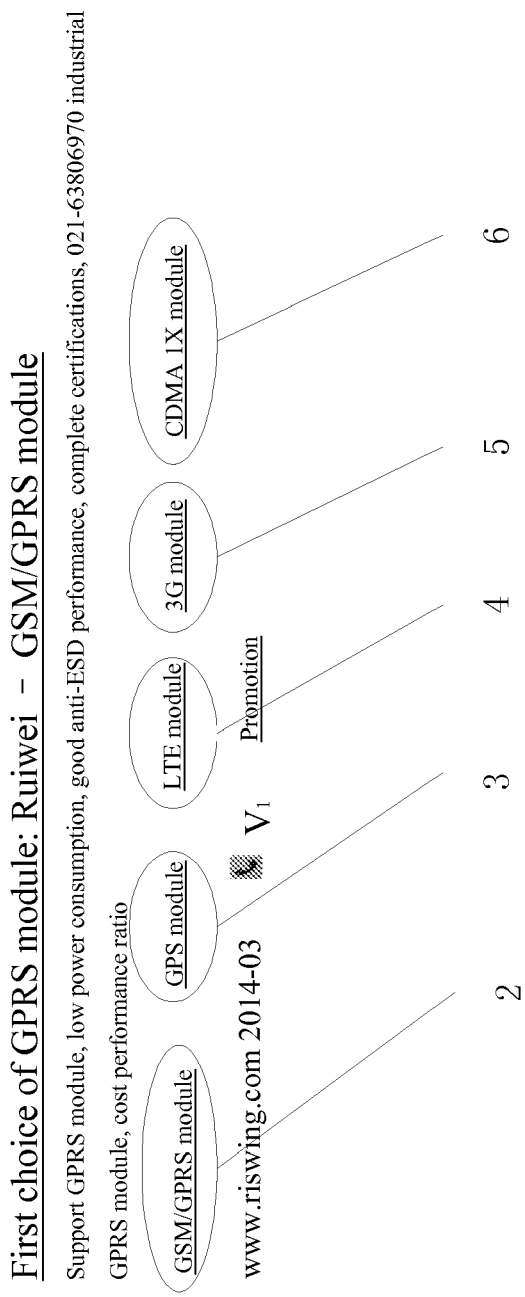

FIGS. 2(a), (b), (c) and (d) are effect presenting charts of a method for presenting a search result according to an embodiment of the present invention. As shown in FIG. 2(a), a region 1 shows an online recommendation result, and a link page corresponding to the text may be directly opened by clicking the region 1. As shown in FIG. 2(b), regions 2, 3, 4, 5 and 6 show online recommendation results; a page of a GSM/GPRS module may be opened by clicking the region 2; a page of a GPS module may be opened by clicking the region 3; a page of an LTE module may be opened by clicking the region 4; a page of a 3G module may be opened by clicking the region 5; and a page of a CDMA 1X module may be opened by clicking the region 6. As shown in FIG. 2(c), regions 7 and 8 show online recommendation results; a page corresponding to hotels of a popular scenic spot may be opened by clicking the region 7; and a page corresponding to room type classifications of the hotels may be opened by clicking the region 8. As shown in FIG. 2(d), regions 9 and 10 show online recommendation results; clicking a picture of a corresponding flower displayed in the region 9, if the user is a man for example, may display a rose; and a corresponding video displayed in the region 10, when clicked, may for example provide the user with guidance on how to reserve flowers, etc. It should be understood that FIGS. 2(a), (b), (c) and (d) are merely exemplary schematic diagrams, and those skilled in the art may design various effect presenting charts, for example, pictures, audio and video, etc. may be directly presented in the regions of the above-mentioned example diagrams. The effect charts shown in FIGS. 2(a), (b), (c) and (d) may enable the advantages of the embodiments of the present invention to be more apparent, but cannot limit the scope of protection of the present invention.

The method for presenting a search result in the embodiments of the present invention can acquire an online recommendation result associated with a user according to a current search term input by the user and user information, and the online recommendation results obtained under different search terms by different users are completely different; therefore, on the one hand, a personalized search service may be provided for the user, so that the search result better meets the user's needs. On the other hand, due to the fact that an online recommendation result better meeting the user's needs is recommended to the user, the online recommendation can be clicked and browsed by the user to the greatest degree possible, thereby improving the click-through rate of the online recommendation result and improving the recommendation effect.

Figure 3:
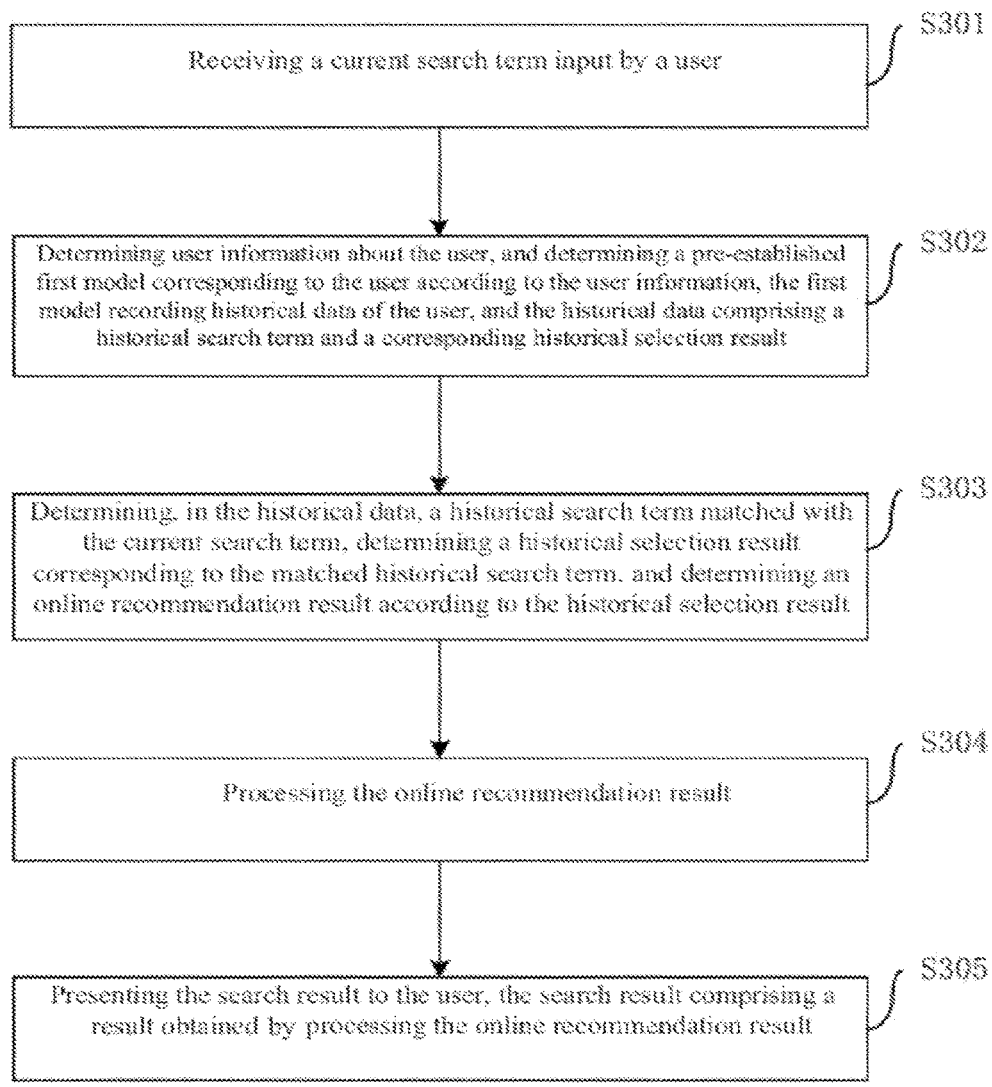
FIG. 3 is a flowchart of a method for presenting a search result according to another embodiment of the present invention.

FIG. 3 is a flowchart of a method for presenting a search result according to another embodiment of the present invention. The embodiment shown in FIG. 3 will describe how to determine an online recommendation result according to a historical selection result in detail.

As shown in FIG. 3, the method for presenting a search result comprises:

S301, a current search term input by a user is received.

Specifically, in the embodiments of the present invention, a user can input the current search term in an input box provided by a search engine, and the user can also input search terms in various quick search input boxes, and this is not limited in the embodiments of the method.

S302, user information about the user is determined, and a pre-established first model corresponding to the user is determined according to the user information, the first model recording historical data of the user, and the historical data comprising a historical search term and a corresponding historical selection result.

Specifically, the user information may be obtained according to cookie information, and may also be obtained by means of a registration account number of the user, for example, the search engine obtains identity identification information allocated to a client used by the user in the cookie information, or address information (such as an IP address and a geographic position) of the client used by the user, etc., or the registration account number of the user, etc. The user can be determined by the user information.

The first model is obtained according to a vast amount of historical search behavior data, the historical search behavior data comprising historical selection results of the user on historical search results, and these historical selection results per se reflecting a certain need of the user, for example, different users click and browse different historical search results under different historical search terms, and the historical search behavior data may be recorded using a website monitoring statistics tool. The first model may also be obtained according to advertisement-related data spliced in reverse from the historical selection results of the user on the historical search results, for example, the historical search behavior data comprise the historical selection results of the user on the historical search results, and in addition, page content of an advertisement webpage of an advertiser is extracted; if a historical selection result matches with the page content, the historical selection result is replaced by the page content, and anchor text clicked by the user after entering the advertisement page of the advertiser by clicking under a certain historical search term may be obtained, for example, the first model comprises a search term, a text link corresponding to the search term and page content (the text link and the page content form the anchor text), and the text link and the page content corresponding to the search term are the historical selection result.

In one embodiment of the present invention, in S302, the step of determining a pre-established first model corresponding to the user according to the user information specifically comprises determining attribute information corresponding to the user according to the user information; and determining the first model corresponding to the user according to the attribute information corresponding to the user. Specifically, the attribute information about the user, for example, may be the user age, user gender, user region, etc., and the attribute information about the user may be obtained according to a vast amount of historical search behavior data. The first model may vary depending on the attribute information about the user, for example, a user from the 80s and a user from the 70s respectively correspond to different first models, and a woman from the 80s and a man from the 80s also respectively have different first models. Therefore, the search result may be made more targeted.

S303, a historical search term matched with the current search term is determined in the historical data; a historical selection result corresponding to the matched historical search term is determined; and an online recommendation result is determined according to the historical selection result.

Specifically, an online recommendation is recommendation information about a third party, such as an advertisement released by an advertiser, an application program published by a third party platform, etc. In one embodiment of the present invention, the online recommendation also needs to be processed, for example, firstly, a page corresponding to the online recommendation is captured, then a clickable link in the page is parsed out, and then corresponding anchor text is generated according to the clickable link, and a page content segment may also be captured.

In one embodiment of the present invention, the page content segment comprises one or more of text, a picture, audio, video, etc.

In one embodiment of the present invention, the step of determining an online recommendation result according to the historical selection result in S303 specifically comprises: searching in a pre-established online recommendation result repository according to the historical selection result, so as to acquire an online recommendation result corresponding to the historical selection result. More specifically, the pre-established online recommendation result repository may be obtained according to an online recommendation processing result, may also be obtained according to an advertisement released by an advertiser itself and page content corresponding to the advertisement, or obtained according to the page content of an advertisement page of the advertiser extracted by a search engine.

S304, the online recommendation result is processed.

In one embodiment of the present invention, S304 comprises at least one of the following:

(1) The online recommendation result is filtered. Specifically, a check is made as to whether a URL corresponding to the online recommendation result is legal, and any illegal URL is eliminated; and a check is made as to whether a special character, etc. is included in the URL corresponding to the online recommendation result, and any special character, etc. is eliminated.

(2) A semantic similarity between the online recommendation result and the search term is calculated, to obtain an online recommendation result having a semantic similarity higher than a set first threshold value. Specifically, a label vector of the search term and a label vector of the online recommendation result may be acquired; a similarity between the label vector of the search term and the label vector of the online recommendation result is calculated to serve as a semantic similarity between the online recommendation result and the search term; and an online recommendation result having a semantic similarity higher than a set first threshold value is obtained by screening, wherein the first threshold value may be set by a user, and may also be a default setting of the search engine. Obtaining the online recommendation result by screening according to the semantic similarity enables the online recommendation result to better meet the personalized needs of the user.

(3) An intention similarity between the online recommendation result and the search term is calculated, to obtain an online recommendation result having an intention similarity higher than a set second threshold value. Specifically, a semantic topic vector of the search term and a semantic topic vector of the online recommendation result may be acquired; a similarity between the semantic topic vector of the search term and the semantic topic vector of the online recommendation result is calculated to serve as an intention similarity between the online recommendation result and the search term; and an online recommendation result having an intention similarity higher than a set second threshold value is obtained by screening, wherein the second threshold value may be set by a user, and may also be a default setting of the search engine. Obtaining the online recommendation result by screening according to the intention similarity enables the online recommendation result to better meet the personalized needs of the user.

(4) A literal association degree between the online recommendation result and the search term is calculated according to an LR (logistic regression) algorithm, to obtain an online recommendation result having a literal association degree higher than a set third threshold value. Specifically, the LR (logistic regression) algorithm uses the first model as training data. The LR (logistic regression) algorithm performs training and takes a click-through rate as an optimization objective, so as to obtain an LR (logistic regression) model, and then the literal association degree between the online recommendation result and the search term is calculated according to the trained LR (logistic regression) model, wherein the third threshold value may be set by a user, and may also be a default setting of the search engine. Obtaining the online recommendation result by screening according to the literal association degree enables the online recommendation result to better meet the personalized needs of the user.

(5) A semantic association degree between the online recommendation result and the search term is calculated according to a GBDT (gradient boost decision tree), to obtain an online recommendation result having a semantic association degree higher than a set fourth threshold value. Specifically, the GBDT (gradient boost decision tree) uses the first model as training data. The GBDT (gradient boost decision tree) performs training and takes a click-through rate as an optimization objective, so as to obtain a GBDT (gradient boost decision tree) model, and then the semantic association degree between the online recommendation result and the search term is calculated according to the trained GBDT (gradient boost decision tree) model, wherein the fourth threshold value may be set by a user, and may also be a default setting of the search engine. Obtaining the online recommendation result by screening according to the semantic association degree enables the online recommendation result to better meet the personalized needs of the user.

It should be understood that at least one of the above-mentioned processing methods may be selected for processing, and this is not limited in the embodiments of the present invention.

S305, the search result is presented to the user, the search result comprising a result obtained by processing the online recommendation result.

In the method for presenting a search result according to the embodiments of the present invention, processing the online recommendation result can ensure that the search result provided for a user is more accurate and better meets the user's needs, and can be clicked and browsed by the user to the greatest degree possible, thereby further increasing the click-through rate of the online recommendation result, and further improving the recommendation effect.

In one embodiment of the present invention, the method for presenting a search result in the embodiments of the present invention further comprises (not shown in the drawings): ranking the processed online recommendation results according to one or more of the semantic similarity, the intention similarity, the literal association degree and the semantic association degree. Specifically, one or more of the semantic similarity, the intention similarity, the literal association degree and the semantic association degree may be chosen to perform weighted calculation; the weights of the semantic similarity, the intention similarity, the literal association degree and the semantic association degree may be different, and a total score for ranking is obtained on this basis, to perform ranking according to the total score for ranking For example, if the semantic similarity, the intention similarity, the literal association degree and the semantic association degree are chosen to rank the processed online recommendation results, firstly weighted calculation may be performed on the semantic similarity and the intention similarity, while at the same time weighted calculation is performed on the literal association degree and the semantic association degree, then weighted calculation is performed according to the calculation results of the two cases, to obtain a total score for ranking, and ranking is performed according to the total score for ranking In one embodiment of the present invention, the method for presenting a search result in the embodiments of the present invention further comprises (not shown in the drawings): acquiring a current search result of a current search term according to the current search term, and the search result presented to a user further comprising the current search result.

In order to implement the above-mentioned embodiments, the embodiments of the present invention also propose an apparatus for providing information.

Figure 4:
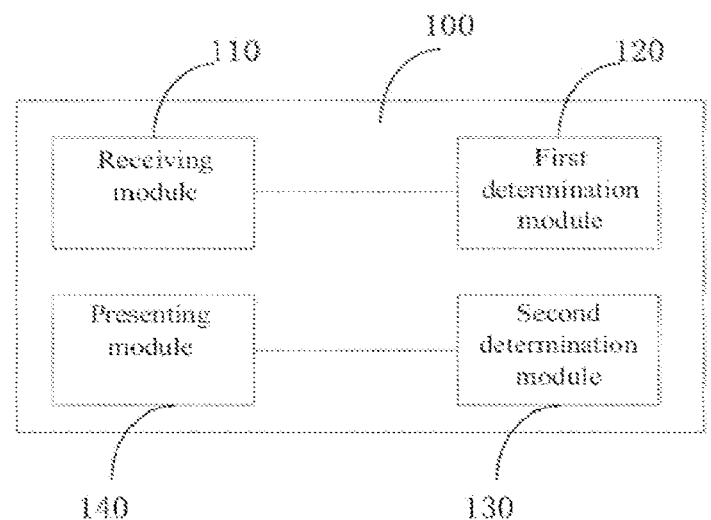
FIG. 4 is a structural block diagram of an apparatus for providing information according to another embodiment of the present invention.

FIG. 4 is a structural block diagram of an apparatus for presenting a search result according to one embodiment of the present invention.

As shown in FIG. 4, the apparatus 100 for presenting a search result comprises a receiving module 110, a first determination module 120, a second determination module 130 and a presenting module 140.

Specifically, the receiving module 110 is used for receiving a current search term input by a user. More specifically, in the embodiments of the present invention, a user can input the current search term in an input box provided by a search engine, and the user can also input search terms in various quick search input boxes, and this is not limited in the embodiments of the method.

The first determination module 120 is used for determining user information about the user, and determining a pre-established first model corresponding to the user according to the user information, the first model recording historical data of the user, and the historical data comprising a historical search term and a corresponding historical selection result.

More specifically, the user information may be obtained according to cookie information, and may also be obtained by means of a registration account number of the user, for example, the search engine obtains identity identification information allocated to a client used by the user in the cookie information, or address information (such as an IP address and a geographic position) of the client used by the user, etc., or the registration account number of the user, etc. The user can be determined by the user information.

The first model is obtained according to a vast amount of historical search behavior data, the historical search behavior data comprising historical selection results of the user on historical search results, and these historical selection results per se reflecting a certain need of the user, for example, different users click and browse different webpages under different historical search terms so as to have different historical search results, and the historical search behavior data may be recorded using a website monitoring statistical tool. The first model may also be obtained according to advertisement-related data spliced in reverse from the historical selection results of the user on the historical search results, for example, the historical search behavior data comprise the historical selection results of the user on the historical search results, and in addition, page content of an advertisement webpage is extracted; if a historical selection result matches with the page content, the historical selection result is replaced by the page content, and anchor text clicked by the user after entering the advertisement webpage by clicking under a certain historical search term may be obtained, for example, the first model comprises a search term, a text link corresponding to the search term and page content (the text link and the page content form the anchor text), and the text link and the page content corresponding to the search term may also serve as the historical selection result.

The second determination module 130 determines, in the historical data, a historical search term matched with the current search term, determines a historical selection result corresponding to the matched historical search term, and determines an online recommendation result according to the historical selection result.

More specifically, an online recommendation is recommendation information about a third party, such as an advertisement released by an advertiser, an application program published by a third party platform, etc. In one embodiment of the present invention, the online recommendation also needs to be processed, for example, firstly, a page corresponding to the online recommendation is captured, then a clickable link in the page is parsed out, and then corresponding anchor text is generated according to the clickable link, and a page content segment may also be captured.

In one embodiment of the present invention, the page content segment comprises one or more of text, a picture, audio, video, etc.

The presenting module 140 is used for presenting a search result to the user, the search result comprising the online recommendation result or a result obtained by processing the online recommendation result.

Specifically, in the embodiments of the present invention, a search engine may directly present the determined online recommendation result to the user, and may also present the online recommendation result to the user after processing same.

The specific presenting effect is as stated in the above-mentioned method embodiments, and will not be described here again redundantly.

The apparatus for presenting a search result of the embodiments of the present invention can acquire an online recommendation result associated with a user according to a current search term input by the user and user information, and the online recommendation results obtained under different search terms by different users are completely different; therefore, on the one hand, a personalized search service may be provided for the user, so that the search result better meets the user's needs. On the other hand, due to the fact that an online recommendation result better meeting the user's needs is recommended to the user, the online recommendation can be clicked and browsed by the user to the greatest degree possible, thereby improving the click-through rate of the online recommendation result and improving the recommendation effect.

In one embodiment of the present invention, the first determination module 120 is specifically used for: determining attribute information corresponding to the user according to the user information, and determining the first model corresponding to the user according to the attribute information corresponding to the user. Specifically, the attribute information about the user, for example, may be the user age, user gender, user region, etc., and the attribute information about the user may be obtained according to a vast amount of historical search behavior data. The first model may be different depending on the attribute information about the user, for example, a user from the 80s and a user from the 70s respectively correspond to different first models, and a woman from the 80s and a man from the 80s also respectively have different first models. Therefore, the search result may be made more targeted.

In one embodiment of the present invention, the second determination module 130 is specifically used for: searching in a pre-established online recommendation result repository according to the historical selection result, so as to acquire an online recommendation result corresponding to the historical selection result. More specifically, the pre-established online recommendation result repository may be obtained according to an online recommendation processing result, may also be obtained according to an advertisement released by an advertiser itself and page content corresponding to the advertisement, or obtained according to the page content of an advertisement page of the advertiser extracted by a search engine.

Figure 5:
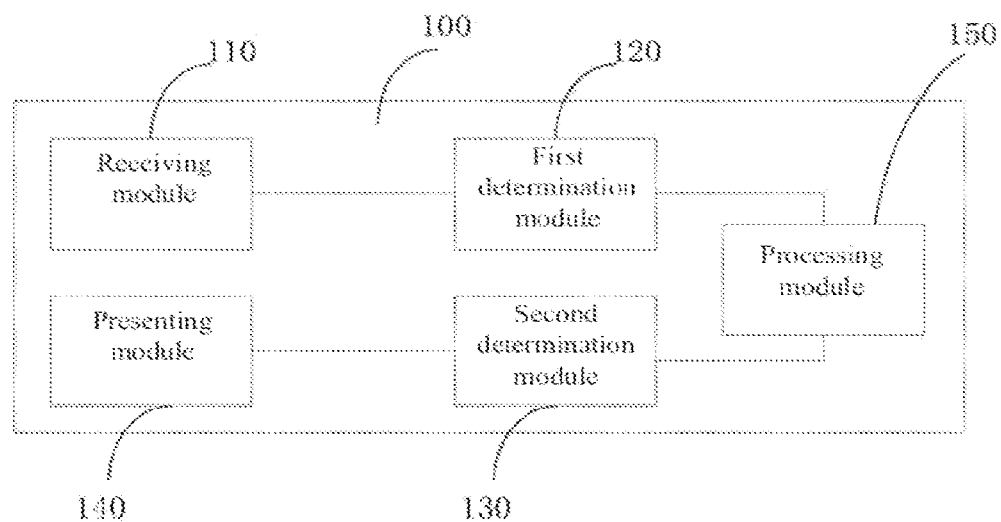
FIG. 5 is a structural block diagram of an apparatus for presenting a search result according to another embodiment of the present invention.

FIG. 5 is a structural block diagram of an apparatus for presenting a search result according to another embodiment of the present invention.

As shown in FIG. 5, the apparatus 100 for presenting a search result comprises a receiving module 110, a first determination module 120, a second determination module 130, a presenting module 140 and a processing module 150.

Specifically, when a search result comprises a result obtained by processing an online recommendation result, the processing module 150 is used for processing the online recommendation result. Processing the online recommendation result enables the online recommendation result to be more optimized and better meet the personalized needs of a user.

In one embodiment of the present invention, the step of processing, by the processing module 150, the online recommendation result comprises at least one of the following:

(1) The online recommendation result is filtered. Specifically, a check is made as to whether a URL corresponding to the online recommendation result is legal, and any illegal URL is eliminated; and a check is made as to whether a special character is included in the URL corresponding to the online recommendation result, etc., and any special character is eliminated, etc.

(2) A semantic similarity between the online recommendation result and the search term is calculated, to obtain an online recommendation result having a semantic similarity higher than a set first threshold value. Specifically, a label vector of the search term and a label vector of the online recommendation result may be acquired; a similarity between the label vector of the search term and the label vector of the online recommendation result is calculated to serve as a semantic similarity between the online recommendation result and the search term; and an online recommendation result having a semantic similarity higher than a set first threshold value is obtained by screening, wherein the first threshold value may be set by a user, and may also be a default setting of the search engine. Obtaining the online recommendation result by screening according to the semantic similarity enables the online recommendation result to better meet the personalized needs of the user.

(3) An intention similarity between the online recommendation result and the search term is calculated, to obtain an online recommendation result having an intention similarity higher than a set second threshold value. Specifically, a semantic topic vector of the search term and a semantic topic vector of the online recommendation result may be acquired; a similarity between the semantic topic vector of the search term and the semantic topic vector of the online recommendation result is calculated to serve as an intention similarity between the online recommendation result and the search term; and an online recommendation result having an intention similarity higher than a set second threshold value is obtained by screening, wherein the second threshold value may be set by a user, and may also be a default setting of the search engine. Obtaining the online recommendation result by screening according to the intention similarity enables the online recommendation result to better meet the personalized needs of the user.

(4) A literal association degree between the online recommendation result and the search term is calculated according to an LR (logistic regression) algorithm, to obtain an online recommendation result having a literal association degree higher than a set third threshold value. Specifically, the LR (logistic regression) algorithm uses the first model as training data. The LR (logistic regression) algorithm performs training and takes a click-through rate as an optimization objective, so as to obtain an LR (logistic regression) model, and then the literal association degree between the online recommendation result and the search term is calculated according to the trained LR (logistic regression) model, wherein the third threshold value may be set by a user, and may also be a default setting of the search engine. Obtaining the online recommendation result by screening according to the literal association degree enables the online recommendation result to better meet the personalized needs of the user.

(5) A semantic association degree between the online recommendation result and the search term is calculated according to a GBDT (gradient boost decision tree), to obtain an online recommendation result having a semantic association degree higher than a set fourth threshold value. Specifically, the GBDT (gradient boost decision tree) uses the first model as training data. The GBDT (gradient boost decision tree) performs training and takes a click-through rate as an optimization objective, so as to obtain a GBDT (gradient boost decision tree) model, and then the semantic association degree between the online recommendation result and the search term is calculated according to the trained GBDT (gradient boost decision tree) model, wherein the fourth threshold value may be set by a user, and may also be a default setting of the search engine. Obtaining the online recommendation result by screening according to the semantic association degree enables the online recommendation result to better meet the personalized needs of the user.

It should be understood that at least one of the above-mentioned processing methods may be selected for processing, and this is not limited in the embodiments of the present invention.

By processing the online recommendation result, the apparatus for presenting a search result according to the embodiments of the present invention can ensure the search result provided for a user is more accurate and better meets the user's needs, and can be clicked and browsed by the user to the greatest degree possible, thereby further increasing the click-through rate of the online recommendation result, and further improving the recommendation effect.

In one embodiment of the present invention, the apparatus for presenting a search result in the embodiments of the present invention further comprises a ranking module (not shown in the drawings): the ranking module is used for ranking the processed online recommendation results according to one or more of the semantic similarity, the intention similarity, the literal association degree and the semantic association degree. Specifically, one or more of the semantic similarity, the intention similarity, the literal association degree and the semantic association degree may be chosen to perform weighted calculation; the weights of the semantic similarity, the intention similarity, the literal association degree and the semantic association degree may be different, and a total score for ranking is obtained on this basis, to perform ranking according to the total score for ranking For example, if the semantic similarity, the intention similarity, the literal association degree and the semantic association degree are chosen to rank the processed online recommendation results, firstly weighted calculation may be performed on the semantic similarity and the intention similarity, while at the same time, weighted calculation is performed on the literal association degree and the semantic association degree, then weighted calculation is performed according to the calculation results of the two cases, to obtain a total score for ranking, and ranking is performed according to the total score for ranking In one embodiment of the present invention, the apparatus for presenting a search result in the embodiments of the present invention further comprises an acquisition module (not shown in the drawings): the acquisition module is used for acquiring a current search result of a current search term according to the current search term, wherein the search result presented by the presenting module 140 to the user further comprises the current search result.

It should be understood that the various parts of the present invention may be implemented by means of hardware, software, firmware or a combination thereof. In the embodiments above, a plurality of steps or methods may be implemented by means of software or firmware stored in a memory and executed by an appropriate instruction execution system. The memory can include one or more programs stored thereon for instructing a hardware processor to implement the plurality of steps or methods. For example, if implemented by means of hardware, as in another embodiment, it can be implemented by means of any one or a combination of the following techniques commonly known in the art: a discrete logical circuit having a logical gate circuit used for implementing a logical function for a data signal, an application-specific integrated circuit having an appropriate combinational logical gate circuit, a programmable gate array (PGA), a field programmable gate array (FPGA), etc.

In the description of the specification, the description of the reference terms such as "one embodiment", "some embodiments", "an example", "a specific example" or "some examples" is intended to mean that a particular feature, structure, material or characteristic described in connection with the embodiment or example is included in at least one embodiment or example of the present invention. In the present description, the illustrative expression of the above-mentioned terms does not necessarily refer to the same embodiment or example. Furthermore, particular features, structures, materials or characteristics described may be combined in a suitable manner in any one or more embodiments or examples.

Although the embodiments of the present invention have been shown and described, those of ordinary skill in the art shall understand that various changes, modifications, replacements and variations of the embodiments can be made to these embodiments without departing from the principle and spirit of the present invention, and the scope of the present invention is defined by the claims and equivalents thereof.

What is claimed is:

1. A method for presenting a search result in response to a current search term, comprising:
   determining a pre-established first model corresponding to preselected user information and including historical user search data;
   identifying a selected historical search term in the historical user search data that corresponds with the current search term;
   identifying a selected historical selection result in the historical user search data that corresponds with the identified historical search term;
   determining the search result based upon the identified historical selection result, said determining the search result comprising determining an online recommendation result based upon the identified historical selection result;
   processing the online recommendation result to generate a generated recommendation result; and
   presenting the generated recommendation result,
   wherein said processing comprises:
      calculating a literal association degree between the online recommendation result and the current search term according to a logistic regression process such that the online recommendation result has the literal association degree that is greater than a preselected third threshold value;
      calculating a semantic association degree between the online recommendation result and the current search term according to a gradient boost decision tree such that the online recommendation result has the semantic association degree that is greater than a preselected fourth threshold value; or
a combination thereof.

2. The method of claim 1, wherein said determining the pre-established first model includes determining the preselected user information.

3. The method of claim 1, wherein said determining the pre-established first model comprises determining the pre-established first model including the historical user search data with a plurality of historical search terms and a plurality of historical selection results that corresponds with the plurality of the historical search terms.

4. The method of claim 1, wherein said determining the pre-established first model comprises:
determining user attribute information according to the user information; and
determining the pre-established first model based upon said determining the user attribute information.

5. The method of claim 1, further comprising
presenting the online recommendation result.

6. The method of claim 1, wherein said determining the online recommendation result comprises:
searching in a pre-established online recommendation result repository according to the historical selection result; and
acquiring the online recommendation result based upon said searching.

7. The method of claim 1, wherein said processing the online recommendation result comprises:
filtering the online recommendation result;
calculating a semantic similarity between the online recommendation result and the current search term such that the online recommendation result has the semantic similarity that is greater than a preselected first threshold value;
calculating an intention similarity between the online recommendation result and the current search term such that the online recommendation result has the intention similarity that is greater than a preselected second threshold value; or
a combination thereof.

8. The method of claim 7, further comprising ranking the generated online recommendation result generated by said filtering, said calculating the semantic similarity, said calculating the intention similarity, said calculating the literal association degree, said calculating the semantic association degree, or a combination thereof.

9. The method of claim 1, wherein said calculating the literal association degree comprises calculating the literal association degree according to a logistic regression model trained by a logistic regression algorithm, wherein the logistic regression algorithm trains the logistic regression model by using the pre-established first model as training data and taking a click-through rate as an optimization objective.

10. The method of claim 1, wherein said calculating the semantic association degree comprises calculating the literal association degree according to a gradient boost decision tree model trained by a gradient boost decision tree, wherein the gradient boost decision tree trains the gradient boost decision tree model by using the pre-established first model as training data and taking a click-through rate as an optimization objective.

11. An apparatus for presenting a search result in response to a current search term, comprising:

a hardware processor; and
a memory having one or more programs stored thereon for instructing said hardware processor to:
determine a pre-established first model corresponding to preselected user information and including historical user search data;
identify a selected historical search term in the historical user search data that corresponds with the current search term;
identify a selected historical selection result in the historical user search data that corresponds with the identified historical search term;
determine the search result based upon the identified historical selection result, wherein determining the search result includes determining an online recommendation result based upon the identified historical selection result;
process the online recommendation result to generate a generated recommendation result; and
present the generated recommendation result,
wherein said hardware processor is configured to process the recommendation result via at least one process selected from a process group including:
calculating a literal association degree between the online recommendation result and the current search term according to a logistic regression process such that the online recommendation result has the literal association degree that is greater than a preselected third threshold value;
calculating a semantic association degree between the online recommendation result and the current search term according to a gradient boost decision tree such that the online recommendation result has the semantic association degree higher than a preselected fourth threshold value; or
a combination thereof.

12. The apparatus of claim 11, wherein said hardware processor is adapted to:
determine user attribute information according to the user information; and
determine the pre-established first model based upon the user attribute information.

13. The apparatus of claim 11, wherein the one or more programs instruct said hardware processor to:
receive the current search term; and
present the search result,
wherein the historical user search data includes a plurality of historical search terms and a plurality of historical selection results that corresponds with the plurality of the historical search terms, and
wherein said hardware processor is adapted to determine the preselected user information for the pre-established first model.

14. The apparatus of claim 11, wherein said hardware processor is adapted to
present the online recommendation result.

15. The apparatus of claim 11, wherein said hardware processor is adapted to determine the online recommendation result by searching a pre-established online recommendation result repository according to the historical selection result.

16. The apparatus of claim 11, wherein the process group further includes:
filtering the online recommendation result;
calculating a semantic similarity between the online recommendation result and the current search term such that the online recommendation result has the semantic similarity that is greater than a preselected first threshold value;

calculating an intention similarity between the online recommendation result and the current search term such that the online recommendation result has the intention similarity that is greater than a preselected second threshold value; or a combination thereof.

17. The apparatus of claim 16, wherein the one or more programs instruct said hardware processor to rank the generated online recommendation result generated via the at least one selected process of the process group.

18. The apparatus of claim 11, wherein the online recommendation result includes anchor text, a page content segment, or a combination thereof.

19. The apparatus of claim 18 wherein the page content segment includes text, a picture, audio, video, or a combination thereof.

20. A method for presenting a search result in response to a current search term, comprising:

receiving a current search term input by a user;

determining user information about the user;

determining a pre-established first model corresponding to the user according to the user information, the first model recording historical data of the user, the historical data including at least one historical search term and a corresponding historical selection result;

determining, in the historical data, a historical search term matched with the current search term;

determining a historical selection result corresponding to the matched historical search term;

determining an online recommendation result according to the historical selection result; and presenting the search result to the user, wherein the search result includes a result obtained by processing the online recommendation result, wherein processing the online recommendation result includes:

calculating a literal association degree between the online recommendation result and the current search term according to a logistic regression process such that the online recommendation result has the literal association degree that is greater than a preselected third threshold value;

calculating a semantic association degree between the online recommendation result and the current search term according to a gradient boost decision tree such that the online recommendation result has the semantic association degree higher than a preselected fourth threshold value; or a combination thereof.

\* \* \* \* \*